United States Patent
Lambert

[15] 3,657,937
[45] Apr. 25, 1972

[54] COMBINATION BRAKE AND BREAK-OVER MECHANISM FOR VARIABLE SPEED CONTROL MECHANISM

[72] Inventor: George M. Lambert, Columbus, Ind.
[73] Assignee: Reliance Electric Company, Cleveland, Ohio
[22] Filed: July 10, 1970
[21] Appl. No.: 53,841

[52] U.S. Cl. .................................................. 74/230.17
[51] Int. Cl. .................................................. F16h 55/52
[58] Field of Search .................................... 74/230.17 C

[56] References Cited

UNITED STATES PATENTS

| | | | |
|---|---|---|---|
| 2,636,396 | 4/1963 | Reeves | 74/230.17 C |
| 2,422,196 | 6/1947 | Heyer | 74/230.17 C |
| 3,109,315 | 11/1963 | Luenberger | 74/230.17 C |
| 3,117,461 | 1/1964 | Fermier | 74/230.17 C |

Primary Examiner—C. J. Husar
Attorney—Hood, Gust, Irish, Lundy & Coffey

[57] ABSTRACT

A variable speed system of the type including a V-pulley having an axially shiftable pulley disc wherein the improvement comprises first rotary means, such as a cam, journaled in the system, first means, such as a cam follower, for drivingly connecting the first rotary means to the shiftable pulley disc axially to move the disc when the first rotary means is driven, second rotary means, such as a manually adjustable knob, and second means for drivingly connecting the second rotary means to the first rotary means. This second means includes a rotary member positively drivingly connected to the first rotary means, and spring means for providing a torque-limited, yieldable driving connection between the said member and the second rotary means. The second means also includes a friction plate disposed axially between the said member and a relatively stationary portion of the system, the spring means being effective yieldably to urge the member and the friction plate against the stationary portion to provide a friction brake resisting rotation of said member.

11 Claims, 4 Drawing Figures

PATENTED APR 25 1972
3,657,937
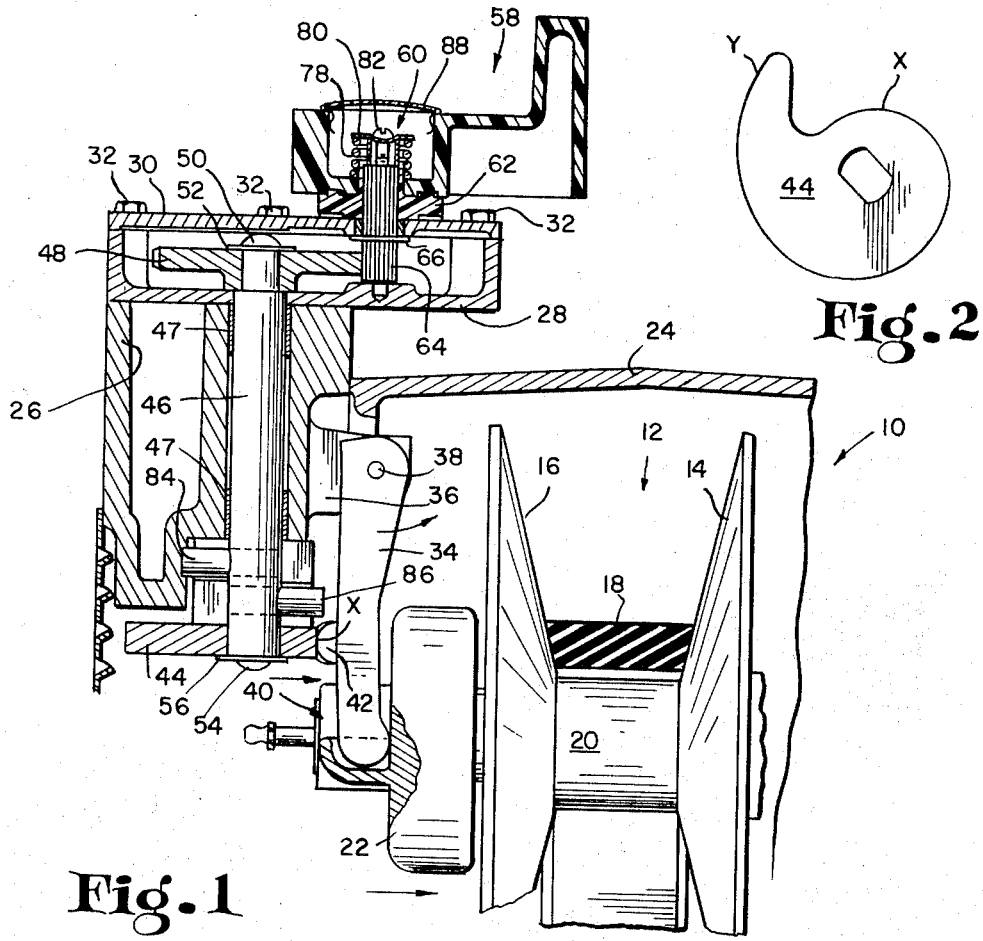
Fig.1
Fig.2
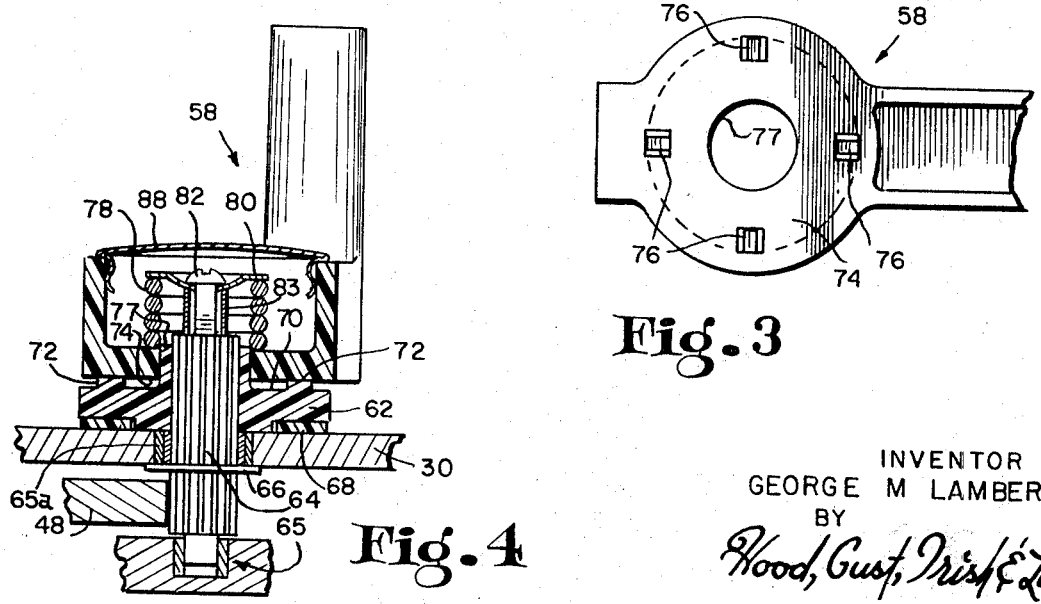
Fig.4
Fig.3
INVENTOR
GEORGE M LAMBERT
BY
Hood, Gust, Irish & Lundy
ATTORNEYS

COMBINATION BRAKE AND BREAK-OVER MECHANISM FOR VARIABLE SPEED CONTROL MECHANISM

It is a primary object of my present invention to provide an improved control mechanism for controllably axially shifting the movable pulley disc of an expansible V-pulley of a conventional variable speed V-pulley system.

It is well known that variable speed V-pulley systems comprise V-pulleys having at least one axially shiftable pulley disc, i.e., a coned disc which is axially movable toward and away from its cooperating coned disc. Conventionally, edge-active belts are trained about these pulleys with the edge of the belts engaging the conical surfaces of the pulley discs. Conventionally, one of the two pulleys of such a system may be resiliently expansible, the other pulley being expanded to decrease its effective diameter and retracted to increase its effective diameter by control means. Conventionally, manually adjustable control means have been provided for axially shifting the control disc of the control pulley.

It is an object of my invention to provide such a control means which includes a combination friction brake and a torque-limited break-over mechanism for drivingly connecting the knob or lever which is manually adjusted to the rotary member which is, in turn, drivingly connected to the control disc.

Other objects and features of my present invention will become apparent as this description progresses.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is a fragmentary elevational view showing my improved control system;

FIG. 2 is a sectional view showing the perimeter of the control cam of my illustrative system;

FIG. 3 is an enlarged fragmentary view showing the axially inwardly facing surface of the control knob of my illustrative system; and FIG. 4 is a fragmentary sectional view, enlarged, showing the manner in which my brake and break-over mechanism operate.

Referring now to the drawings, and particularly to FIG. 1, it will be seen that I have illustrated a portion of a variable speed system 10 including an expansible V-pulley 12 having conventional conically shaped discs 14, 16, the disc 16 being the control disc, i.e., the axially shiftable disc. A conventional edge-active belt 18 is trained about the pulley 12 drivingly to connect the pulley to a resiliently expansible V-pulley not shown. I show a hub 20 for the pulley 12, the disc 16 being axially shiftable relative to this hub. Conventionally, a thrust bearing 22 is provided with the inner race (not shown) of this bearing being connected to the disc 16. The well known reasons why a thrust bearing is used in the manner illustrated will become apparent as this description progresses.

The pulleys of the system 10 are contained in a housing, a portion of which is indicated at 24. My control system is contained primarily in a housing indicated at 26 and at 28. The upper portion of the housing 28 is closed by a cover plate 30 attached thereto by means such as the illustrated screws 32. For purposes of this description, it can be assumed that the housings 24, 26, 28 are rigidly secured together by conventional fastening means. These housings and, for instance, the cover plate 30, are considered to be relatively stationary portions of the system 10.

My control system includes a control arm 34 which is pivotally connected to a pair of inwardly extending ears 36 (only one of which is shown) by means of a pin 38. The lower portion of this arm 34 is conventionally engaged with the thrust bearing 22 as indicated at 40. The arm 34 provides a cam follower portion 42 which cooperates with a control cam 44. The cam 44 is mounted on the lower end of a vertically extending shaft 46 which carries, at its upper end, a spur gear 48. It will be seen that, in the illustrative embodiment, the gear 48 is secured to the shaft 46 by means of a screw 50 and washer 52 while the cam 44 is similarly secured to the shaft 46 by means of a screw 54 and washer 56. The shaft 46 may be journaled in bearing bushings 47 as shown.

The shaft 46 and the cam 44 may be considered first rotary means and the arm 34 and thrust bearing 22 may be considered first means for drivingly connecting the first rotary means to the disc 16 axially to move the disc when the first rotary means is driven. Thus, my second rotary means is indicated at 58, and it will be seen that the second rotary means may advantageously be a knob or a lever which can be manually operated. I then provide second means, indicated generally at 60, for drivingly connecting the knob 58 to the shaft 46. This second means 60 will now be discussed in detail. It will be appreciated that the knob 58 may or may not be provided with an outwardly extending lever-like portion as illustrated.

The second means 60 includes a member 62 which is splined to a shaft 64 for rotation therewith, the shaft 64 being journal mounted in the housing 28 as indicated at 65, 65a in FIG. 4. The gear 48 is meshed with the shaft 64 as illustrated. The bearing indicated at 65a may be a conventional bearing having an outer race which is stationary relative to the plate 30 and an inner race which rotates with the shaft 64. A retainer flange 66 is arranged to prevent axial movement of the shaft 64. The flange 66 and the inner race of bearing 65a may be soldered or otherwise securely fastened to the shaft 64. The member 62 can move at least slightly axially on the shaft 64 and there is a friction ring or friction plate 68 disposed axially between the member 62 and the cover plate 30. This plate 68, which serves as a brake plate as will be described hereinafter, may be adhesively or otherwise rigidly fastened to the member 62.

The illustrative member 62 provides an axially outwardly facing surface 70 having four peripherally equally spaced apart axially outwardly extending lugs 72. The knob 58 provides an axially inwardly facing surface 74 having formed therein four peripherally equally spaced apart notches 76 arranged, respectively, to engage the lugs 72.

The member 62 is provided with an axially upwardly extending concentric cylindrical sleeve portion which extends into a concentric cylindrical opening 77 in the knob 58. A coiled compression spring 78 is disposed concentrically about the axis of shaft 64 and connected to the axially outer end of the shaft 64 by means of a spring-retainer washer 80 and a screw 82 to bear against the knob 58 to urge its axially inwardly facing surface 74 against the axially outwardly facing surface 70 of the member 62. Thus, the spring 78 is effective yieldably to maintain engagement of the lugs 72 in the notches 76. The spring 78 is also effective to urge the knob 58, member 62 and friction plate 68 axially inwardly toward the cover plate 30. Thus, the combination of the spring force and the friction plate 68 provides a brake which resists rotation of the shaft 64.

The knob 58 is drivingly connected to the member 62 through the lugs 72 and notches 76 which are yieldably held in engagement by the spring 78. As best seen in FIG. 3, the notches 76 are provided with beveled entry surfaces and exit surfaces and, the lugs 72 are preferably provided with conformingly shaped beveled surfaces. Thus, when the knob 58 is rotated and the member 62 will not turn, the spring 78 will permit the knob 58 to move axially outwardly to break the engagement of the lugs 72 and the notches 76. When such a condition exists, therefore, the operator adjusting the knob 58 will know that he is to quit turning the knob in the direction which will produce such a break-away action. Of course, the spring 78 can be calibrated by adjusting the screw 82 so that the torque at which this break-away action will be produced can be selectively established. The calibration of the spring 78 will, of course, determine the holding power of the brake plate 68.

In the illustrative embodiment, the shaft 46 carries stop means 84, 86 which are arranged to engage abutments (not shown) to limit the rotational movement of the shaft and, in turn, member 62. One of the stop means 84, 86 may correspond to the point indicated at X on the perimeter of the cam 44 (FIG. 2) and the other of the stop means may correspond to the point indicated at Y on the perimeter of the cam. In other words, the shaft 46 and cam 44 can be rotated between the points indicated at X, Y to move the control arm 34 from its illustrated position with its follower 42 approximately against point X on the perimeter of the cam 44 until its follower is against point Y on the perimeter of the cam. Obviously, point Y on the perimeter of the cam 44 corresponds to an axially inner position for the pulley disc 16 which represents the approximate point of greatest effective diameter for the pulley 12.

When the shaft 46 is rotated so that the follower moves from point Y toward point X on the perimeter of the cam 44, the resiliently expansible V-pulley (not shown) cooperating with the illustrated V-pulley 12 will pull on the edge-active belt 18 and cause the belt to move radially inwardly toward the hub 20 to move the disc 16 axially outwardly.

Thus, I have solved two serious problems which have been encountered with control mechanisms of the type just discussed. The first problem has to do with breakage resulting from twisting or turning the knob or lever 58 when the cam 44 is at the end of its permissible travel. My torque-limited break-over mechanisms solves this problem. Further, with control mechanism of this type, there is some tendency for the selected position of the shaft 46 to drift because of vibration and other dynamic considerations. The friction brake arrangement solves this problem, and, in addition, provides means for infinitely variable speed adjustment because the shaft 64 can be stopped at any desired position about its axis.

The torque limiting capacity of the break-over mechanism and the holding power of the brake can be easily adjusted by removing the conventional spring-type cap 88 and adjusting the screw 82. It is, a simple and easy adjustment problem.

In addition, I may provide a spacer 83 between the upper end of the shaft 64 and the washer 80 to serve as means for limiting the compression forces on the spring 78. This spacer 83 will prevent tightening the screw 82 to the point at which the break-over mechanism will not be effective or functional.

Finally, in some cases, control motors have been used to drive the control mechanisms, i.e., shafts corresponding to the shaft 46. My present invention lends itself to such a motor control in that the knob 58 can be replaced by a coupling having an axially inwardly facing surface 74 with notches such as indicated at 76.

What is claimed is:

1. In a variable speed system of the type including a V-pulley having an axially shiftable pulley disc, the improvement comprising first rotary means journalled in said system, first means for drivingly connecting said first rotary means to said pulley disc axially to move said pulley disc when said first rotary means is driven, second rotary means, and second means for drivingly connecting said second rotary means to said first rotary means, said second means including a rotary member drivingly connected to said first rotary means, and spring means for providing a torque-limited yieldable driving connection between said member and said second rotary means.

2. The invention of claim 1 in which said second rotary means and said member are movable about a common axis, said spring means being effective axially to urge said second rotary means and said member together.

3. The invention of claim 2 in which said member is mounted for at least slight axial movement toward and away from a relatively stationary portion of said system, and a friction plate disposed axially between said member and said stationary portion, said spring means being effective yieldably to urge said member and said plate against said stationary portion.

4. The invention of claim 3 in which said second rotary means includes a manually adjustable knob having an axially inner surface provided with a plurality of peripherally spaced apart notches, and in which said member provides an axially outer face having a plurality of axially outwardly extending peripherally spaced apart lugs engaging respectively said notches, said spring means being effective yieldably to maintain the engagement of said lugs respectively in said notches.

5. The invention of claim 4 in which said lugs are equally peripherally spaced and there are an equal number of said notches equally peripherally spaced.

6. The invention of claim 5 in which said spring means includes a coiled compression spring urging said knob, said member and said friction plate axially toward said stationary portion.

7. The invention of claim 6 in which said second means includes a journal mounted shaft on which said member is splined for axial movement only relative thereto, said shaft penetrating said axially inner surface of said knob, and said coiled spring being disposed concentrically about the axially outer end of said shaft to bear against said knob.

8. The invention of claim 7 including stop means for defining the limits of rotational movement of said first rotary means, whereby when said knob is rotated to drive said first rotary means to the end of its travel in one direction, further rotation of said knob in the same direction will produce relative movement between said knob and said member.

9. The invention of claim 1 including a friction plate disposed between said member and a relatively stationary portion of said system, said spring means being effective to urge said member and said plate against said stationary portion.

10. The invention of claim 9 in which said second means includes a shaft, said member being mounted on said shaft for rotation therewith, and said second rotary means being yieldably drivingly connected to said member by said spring means for rotation with said shaft.

11. The invention of claim 10 in which said member is splined to said shaft for at least slight axial movement toward and away from said stationary portion, said member having an axially outwardly facing surface, said second rotary means providing an axially inwardly facing surface, one of said surfaces providing a plurality of peripherally spaced apart notches and the other of said surfaces providing a plurality of peripherally spaced apart lugs for engaging respectively said notches, said spring means being effective yieldably to urge said surfaces together to maintain engagement of said lugs in said notches.

* * * * *